US011273724B1

(12) United States Patent
Palombini

(10) Patent No.: US 11,273,724 B1
(45) Date of Patent: Mar. 15, 2022

(54) RECHARGING STATION FOR ELECTRIC AIRCRAFTS AND A METHOD OF ITS USE

(71) Applicant: BETA AIR, LLC, South Burlington, VT (US)

(72) Inventor: John Charles Palombini, Charlotte, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/361,911

(22) Filed: Jun. 29, 2021

(51) Int. Cl.
*B60L 53/30* (2019.01)
*B64F 1/36* (2017.01)
*H02J 7/00* (2006.01)
*B64F 1/20* (2006.01)
*B64C 29/00* (2006.01)
*B60L 58/16* (2019.01)
*B60L 53/20* (2019.01)
*B60L 53/51* (2019.01)
*B60L 53/66* (2019.01)
*B60L 53/10* (2019.01)

(52) U.S. Cl.
CPC .............. *B60L 53/30* (2019.02); *B60L 53/10* (2019.02); *B60L 53/20* (2019.02); *B60L 53/51* (2019.02); *B60L 53/66* (2019.02); *B60L 58/16* (2019.02); *B64C 29/00* (2013.01); *B64F 1/20* (2013.01); *B64F 1/362* (2013.01); *H02J 7/005* (2020.01); *H02J 7/00032* (2020.01); *B60L 2200/10* (2013.01); *B60L 2210/10* (2013.01); *H02J 2207/20* (2020.01)

(58) Field of Classification Search
CPC ...................................... B60L 53/30

USPC ......................................................... 320/109
See application file for complete search history.

(56) References Cited

U.S. PATENT DOCUMENTS

| 9,139,310 | B1 | 9/2015 | Wang |
| 9,678,507 | B1 | 6/2017 | Douglas |
| 10,124,908 | B2 | 11/2018 | Stabler |
| 10,882,410 | B2 | 1/2021 | Renold |
| 2018/0208305 | A1 | 7/2018 | Lloyd |
| 2019/0039712 | A1 | 2/2019 | Moore |
| 2019/0190291 | A1 | 6/2019 | Waters |
| 2019/0325757 | A1 | 10/2019 | Goel |

(Continued)

FOREIGN PATENT DOCUMENTS

| WO | WO-2019020158 A1 * | 1/2019 | ............. B64F 1/005 |
| WO | WO-2019020162 A1 * | 1/2019 | ............... B64F 1/30 |

(Continued)

OTHER PUBLICATIONS

Title: A Rest Stop Where Flying Cars Can Recharge By: Eric Adams Date: Mar. 29, 2020.

(Continued)

*Primary Examiner* — Jerry D Robbins
(74) *Attorney, Agent, or Firm* — Caldwell Intellectual Property Law; Keegan Caldwell; Charles Dresser

(57) ABSTRACT

A system and method for a recharging station including an elevated landing pad, a rechargeable component coupled to the elevated landing pad, a power delivery unit configured to deliver power from a power supply unit or power storage unit to the recharging component, and a support component coupled to the bottom of the elevated landing pad.

19 Claims, 13 Drawing Sheets

(56) References Cited

U.S. PATENT DOCUMENTS

2019/0383052 A1   12/2019   Blake
2020/0349852 A1   11/2020   Dicosola

FOREIGN PATENT DOCUMENTS

WO   WO-2019151947 A8 *  9/2019   .............. B64F 1/007
WO        2019241768 A1   12/2019

OTHER PUBLICATIONS

Title: To take off, flying vehicles first need places to land By: Tore Johnston, Robin Riedel, Shivika Sahdev Date: Aug. 31, 2020.

* cited by examiner

RECHARGING STATION FOR ELECTRIC AIRCRAFTS AND A METHOD OF ITS USE

FIELD OF THE INVENTION

The present invention generally relates to the field of charging systems for electric aircrafts. In particular, the present invention is directed to a recharging station for an electric aircraft and a method of its use.

BACKGROUND

Modern electric aircraft such as vertical takeoff and landing (eVTOL) aircrafts are limited in their range depending on their battery capacity. As such, electric aircrafts require charging stations to rapidly and reliably charge during trips. However modern electric vehicle charging stations put a great strain on electric power grids and cannot reliably and quickly receive power from these sources.

SUMMARY OF THE DISCLOSURE

In an aspect, a recharging station includes an elevated landing pad, a rechargeable component coupled to the elevated landing pad, a power delivery unit configured to deliver power from a power supply unit or power storage unit to the recharging component, and a support component coupled to the bottom of the elevated landing pad.

In an aspect, a method of charging an electric aircraft using an elevated landing pad. In some embodiment, the method may include providing an elevated landing pad. In some embodiments, the elevated landing pad may be coupled to a rechargeable component. In some embodiments, the rechargeable component may be connected to a power delivery unit. In some embodiments, the method may include connecting an electric aircraft placed on the elevatable landing pad coupled to the rechargeable component. In some embodiments, the method may include charging the electric aircraft with power delivered by the rechargeable component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
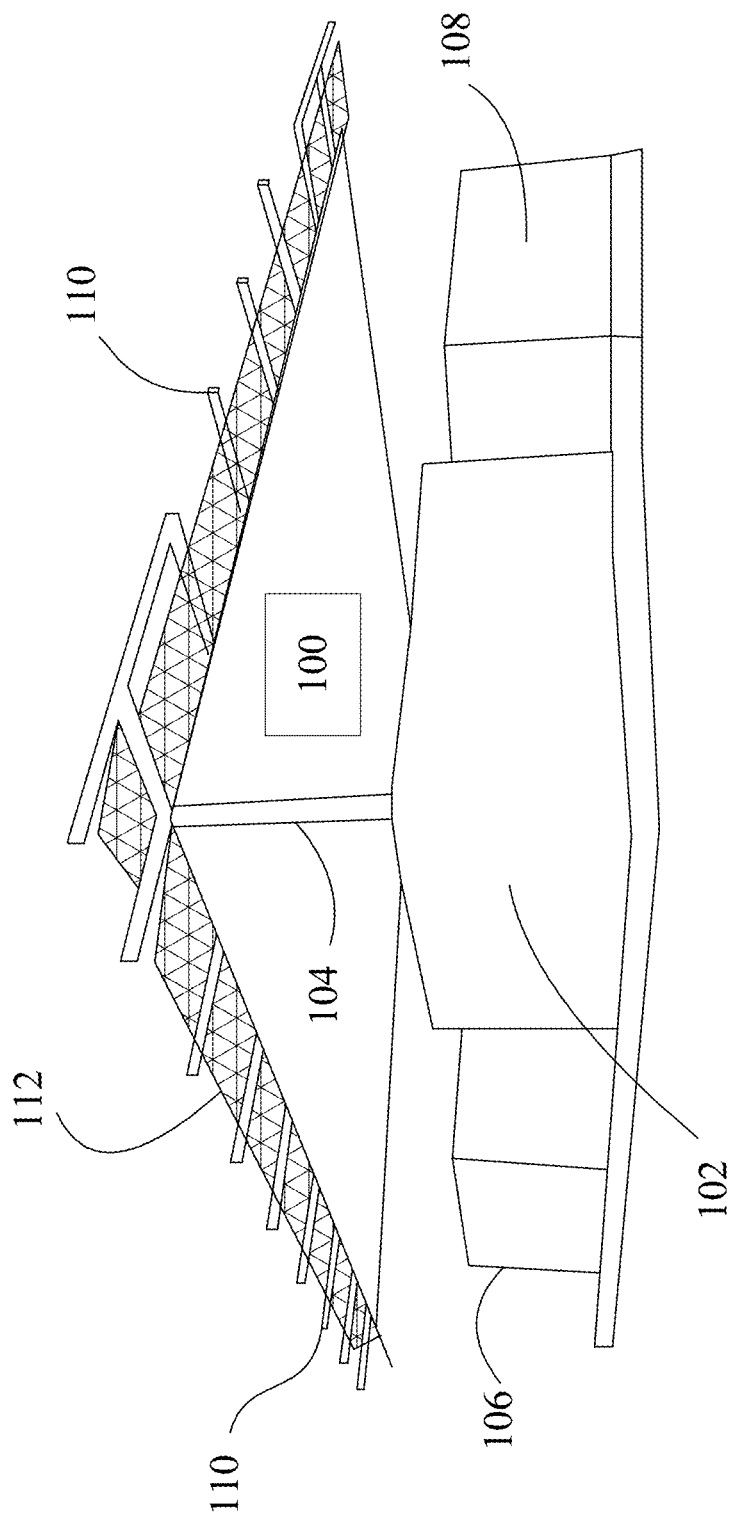
FIG. 1 is a side view of an exemplary embodiment of a recharging station.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for a recharging station for an electric aircraft. In one embodiment, a station for recharging an electric aircraft may include an elevated landing pad, a recharging component coupled to the elevated landing pad, a power delivery unit configured to deliver power from a power supply unit or a power storage unit to the recharging component, and a support component coupled to the bottom of the elevated landing pad. In some embodiments, recharging component may include a trickle charger. In other embodiments, support component may include a hydraulic lift system configured to move one or more persons and cargo to the elevated landing pad. In some embodiments, elevated landing pad may include an integrated lighting system. An integrated lighting system of elevated landing pad may include light-emitting diodes (LEDs) with night vision goggle compatibility. In some embodiments, elevated landing pad may comprise a deicing system. In some embodiments, power supply unit may include a solar inverter for on-site power generation. In some embodiments, support component may include a plurality of housing units. Plurality of housing units may include a freshwater storage unit. Plurality of housing units may also include a kitchen. In some embodiments, station may include a battery management system. In some embodiments, station may include a thermal management system. In another embodiment, recharging station may be configured to communicate data to and from an electric aircraft. In some embodiments, system may include a battery health monitoring system. In some embodiments, an electric aircraft to be used with station may include an eVTOL aircraft.

In some embodiments, recharging component may include a constant voltage charger, a constant current charger, a taper current charger, a pulsed current charger, a negative pulse charger, an IUI charger, a trickle charger and/or a float charger. In some embodiments, power delivery unit may be configured to deliver power stored from a power storage unit. In one embodiment, power storage unit may have a capacity of at least 500 kwh. In some embodiments, power delivery unit may be configured to connect to power storage unit through a DC to DC converter. In one embodiment, elevated landing pad may include an integrated lighting system. In some embodiments, integrated lighting system may include LEDs with night vision goggle compatibility. In one embodiment, elevated landing pad may include an integrated deicing system. In one embodiment, power delivery unit may be configured to connect to power storage unit through a DC to DC converter. In another embodiment, two or more electric aircrafts may be charged through the rechargeable component.

Referring now to FIG. 1, an exemplary embodiment of a recharging station 100 for recharging an electric aircraft is illustrated. As used in this disclosure an "aircraft" is a vehicle that may fly by gaining support from the air. As a non-limiting example, aircraft may include airplanes, helicopters, airships, blimps, gliders, paramotors, drones and the like thereof. In some embodiments, electric aircraft may be an electric vertical takeoff and landing (eVTOL) aircraft, for instance and without limitation as described in further detail below.

Continuing to refer to FIG. 1, an illustration of a recharging station 100 is shown. In some embodiments a recharging station 100 may be constructed from any of variety of suitable materials or any combination thereof. In some embodiments, recharging station 100 may be constructed from metal, concrete, polymers, or other durable materials. In one embodiment, recharging station 100 may be constructed from a lightweight metal alloy. In some embodiments, recharging station 100 may include a helideck or helipad.

In some embodiments, and with further reference to FIG. 1, recharging station 100 may be elevated above sea level. In one embodiment, recharging station 100 may be elevated at least 20 feet above sea level. In some embodiments, recharging station 100 may be elevated more than 20 feet above sea level. In one embodiment, recharging station 100 may have dimensions suitable for supporting various aircraft. In one embodiment, recharging station 100 may be at least 50 feet in area. In other embodiments recharging station 100 may have an area of greater or less than 50 feet. In another embodiment, two or more recharging stations 100 may combine together for greater surface area to support more aircrafts.

In some embodiments, and still referring to FIG. 1, recharging station 100 may have a support component 102 coupled to recharging station 100. In one embodiment, support component 102 may include a support column 104. Support column 104 may be made from a variety of suitable materials, which may include without limitation any materials described above as suitable for the recharging station 100, to support one or more aircrafts on a recharging station 100. In some embodiments the support column 104 may be made from a lightweight metal alloy. In some embodiments, a support component 102 may be coupled to the recharging station 100. The support component 102 may be beneath the recharging station 100 to provide structural support and elevation.

In some embodiments, and continuing to refer to FIG. 1, the support component 102 may have a plurality of support columns 104. The recharging pad 100 may also include supporting structures 110. Supporting structures 110 may provide additional structural support to the recharging station 100. Supporting structures 100 may have a net meshing 112. Net meshing 112 may include a variety of suitable materials. In one embodiment, net meshing 112 may include, without limitation, polyester, nylon, polypropylene, polyethylene, PVC and PTFE. Net meshing 112 may provide additional support to recharging station 100. Net meshing 112 may also act as a safety measure to prevent persons or cargo from falling off recharging station 100.

In some embodiments, and with further reference to FIG. 1, support component 102 may comprise a plurality of modular housings 106. Modular housings 106 may be configured based on the needs of a mission or location. For example, modular housings 106 may contain a hotel container for the pilot and flight crew to rest in. In one embodiment, a hotel container may include a bed, bathroom, shower, and integrated water heaters. In another embodiment, the modular housings 106 may have a control room for pilots and flight crew to relax, eat, study, and plan their next mission.

In another embodiment, and still referring to FIG. 1, a unit of a modular housings 106 may include an electrical power supply 108. Electrical power supply may include an electrical storage unit such as a battery storage unit. The battery storage unit may contain batteries, a solar inverter, a power grid component, and power distribution panels. Any component of electrical power supply, including electrical storage may include, be included in, share components with, and/or be implemented according to any other electrical power supplies, storage units, or the like as described in this disclosure. In one embodiment, the plurality of modular housings of a support component 102 may enable quick construction and deconstruction of a recharging station 100. In one embodiment, a support component 102 may be constructed on top of one or more buildings. In another embodiment, a support component 102 may be constructed in a remote location. In one embodiment, one of the modular housings of support component 102 may have a hotel container. The hotel container may include a bed, a bathroom, a shower, and a sink. In some embodiments, the hotel container may also serve as a storage unit for freshwater, gray water, and blackwater. In other embodiments, the hotel container may serve as a storage unit for a plumbing system. In some embodiments, a plumbing system may be integrated throughout support component 102. In one embodiment, a plumbing system may include integrated water heaters. In some embodiments, the support component 102 may have a hydraulic lift system. In one embodiment, the hydraulic lift system may be configured to ascend or descend one or more persons and cargo to the recharging station 100. In some embodiments, support component 102 may be configured to connect to a surrounding plumbing system. In some embodiments, support component 102 may be configured to connect to a surrounding sewage system. In other embodiments, support component 102 may be configured to connect to a septic tank system.

In some embodiments, and continuing to refer to FIG. 1, recharging station 100 may include a power supply unit. The power supply unit may have electrical components that may be configured to receive electrical power, which may include alternating current ("AC") and/or direct current ("DC") power, and output DC and/or AC power in a useable voltage, current, and/or frequency. In one embodiment, the power supply unit may include a power storage unit 108. The power storage unit 108 may be configured to store 500 kwh of electrical energy. In another embodiment, power storage unit 108 may be configured to store more than 500 kwh of electrical energy. Power storage unit 108 may house a variety of electrical components. In one embodiment, power storage unit 108 may contain a solar inverter. The solar inverter may be configured to produce on-site power generation. In one embodiment, the power generated from the solar inverter may be stored in power storage unit 108. In some embodiments, power storage unit 108 may include a used electric aircraft battery pack no longer fit for flight. Battery pack may be implemented, without limitation, as described in further detail with regard to FIG. 4 below.

Figure 2:
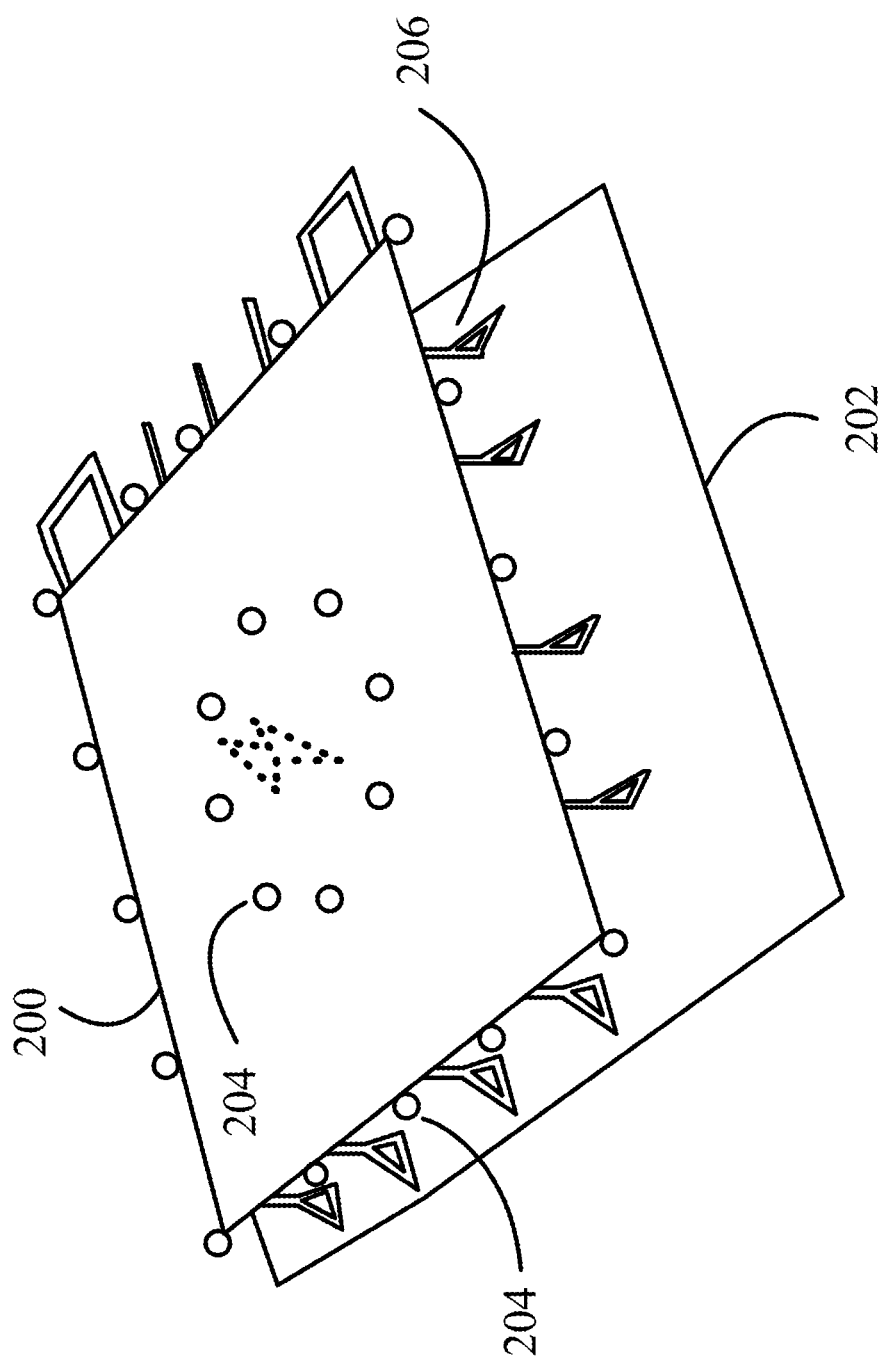
FIG. 2 is a top view of an exemplary embodiment of a recharging station.

FIG. 2 illustrates a top view of an embodiment of a recharging station 200. In one embodiment, recharging station 200 may include an integrated lighting system 204. In one embodiment, the integrated lighting system may include a plurality of light sources 204, such as fluorescent, OLED, incandescent, halogen, metal halide, neon, high intensity discharge, low pressure sodium, and LEDS 204. In one embodiment, light sources 204 may be green. In one embodiment, light sources 204 of the integrated lighting system may include night vision compatibility. In one embodiment, light sources 204 may be able to change colors. In another embodiment, light sources 204 may be configured to switch on and off in a pattern to signal to aircraft various messages, such as a SOS message.

In some embodiments, recharging station 200 may have an integrated deicing system. The integrated deicing system may be configured to keep recharging pad 200 free of weather obstruction such as snow, ice, sleet, or hail. In one embodiment, recharging station 200 may have supporting structures 206. Supporting structures 206 may be configured to support one or more electric aircrafts on recharging station 200. In one embodiment, recharging pad 200 may have a supported base 202. Supported base 202 may be configured to be wider than recharging station 200. Support base 202 may also provide a foundation for other supporting components such as modular units. In another embodiment, support base 202 may have an integrated heating and lighting system.

Figure 3:
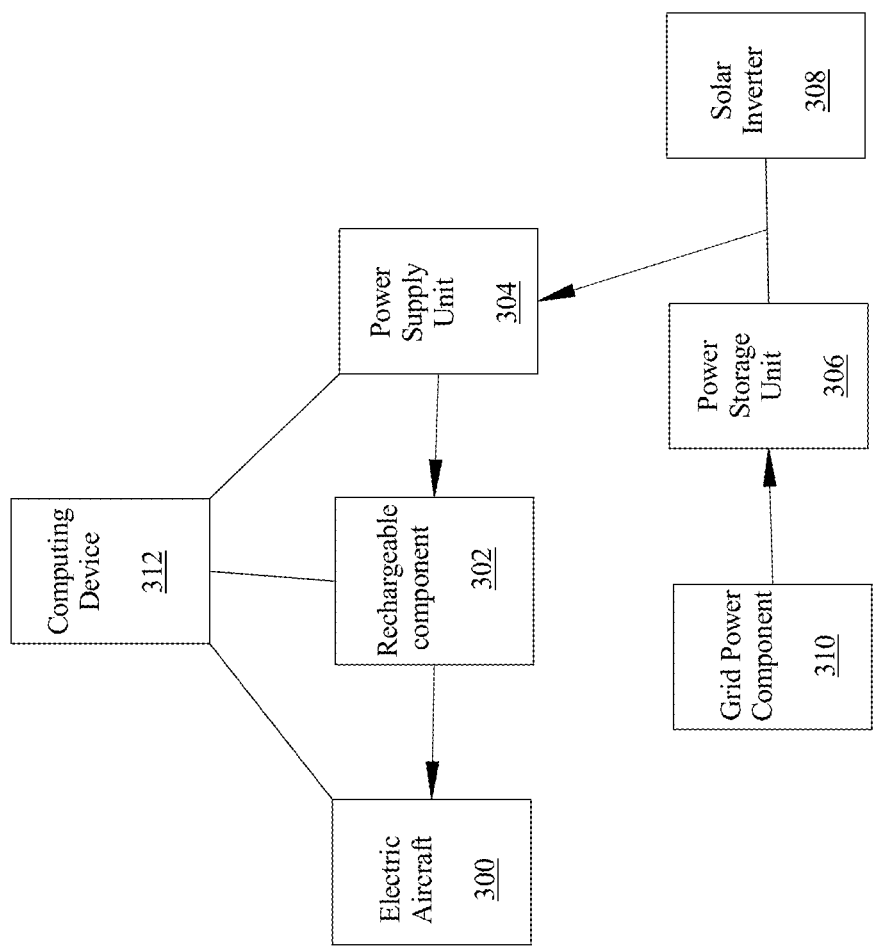
FIG. 3 is a block diagram of an exemplary embodiment of a recharging system.

FIG. 3 illustrates a block diagram of an electrical system for recharging an electric aircraft, which may, without limitation, be incorporated in station 100. In one embodiment, an electric aircraft 300 may be electrically coupled to a rechargeable component 302 of station 100. Rechargeable component 302 may have a plurality of connections to comply with various electric air vehicle needs. In one embodiment, rechargeable component 302 may connect to manned and unmanned electric aircrafts of various sizes, such as an EVTOL or a drone. In another embodiment, rechargeable component 302 may switch between power transfer standards such as the combined charging system standard (CCS) and CHAdeMO standards. In another embodiment, rechargeable component 302 may adapt to multiple demand response interfaces. In one embodiment, rechargeable component 302 may have ADR 2.0 as a demand response interface.

In some embodiments, and still referring to FIG. 3, rechargeable component 302 may have a continuous power rating of at least 350 kVA. In other embodiments, the rechargeable component 302 may have a continuous power rating of over 350 kVA. In some embodiments, rechargeable component 302 may have a battery charge range up to 950 Vdc. In other embodiments, rechargeable component 302 may have a battery charge range of over 950 Vdc. In some embodiments, rechargeable component 302 may have a continuous charge current of at least 350 amps. In other embodiments, rechargeable component 302 may have a continuous charge current of over 350 amps. In some embodiments, rechargeable component 302 may have a boost charge current of at least 500 amps. In other embodiments, rechargeable component 302 may have a boost charge current of over 500 amps. In some embodiments, rechargeable component 302 may include any component with the capability of recharging an energy source of the electric aircraft 300. In some embodiments, rechargeable component 302 may include a constant voltage charger, a constant current charger, a taper current charger, a pulsed current charger, a negative pulse charger, an IUI charger, a trickle charger, and a float charger.

In some embodiments, rechargeable component 302 may receive power from a power supply unit 304. Power supply unit 304 may have a DC to DC converter to convert power into a variety of voltages for rechargeable component 302. Power supply unit 304 may actively switch between multiple power sources. In one embodiment, power supply unit 304 may switch between power from a power storage unit 306 and power from a solar inverter 308. In one embodiment, solar inverter 308 may be configured to absorb solar energy and transform the solar energy into electrical energy. In one embodiment, solar inverter 308 may transform DC to AC. In some embodiments, solar inverter 308 may have a capacity of at least 250 kwh. In other embodiments, solar inverter 308 may have a capacity higher than 250 kwh. In some embodiments, solar inverter 308 may include a solar panel, electrical grade papers, films, coated cloths, laminates, insulation tape, lead pads, and phase separators.

In some embodiments, power supply unit 304 may receive power from the power storage unit 306. Power storage unit 306 may include one or more batteries, capacitors, inductors, or other electrical power storing components. In one embodiment, power supply unit 304 may include repurposed electric aircraft batteries. In some embodiments, power storage unit 306 may have a capacity of at least 500 kwh. In another embodiment, power storage 306 may have a capacity of over 500 kwh. In some embodiments, power storage unit 306 may have a connection to grid power component 310. Grid power component 310 may be connected to an external electrical power grid. In some embodiments, grid power component 310 may be configured to slowly charge one or more batteries in power storage unit 306 in order to reduce strain on nearby electrical power grids. In one embodiment, grid power component 310 may have an AC grid current of at least 450 amps. In some embodiments, grid power component 310 may have an AC grid current of more or less than 450 amps. In one embodiment, grid power component 310 may have an AC voltage connection of 480 Vac. In other embodiments, grid power component 310 may have an AC voltage connection of above or below 480 Vac. In some embodiments, power supply storage unit 306 may provide power to the grid power component 310. In this configuration, power storage unit 306 may provide power to a surrounding electrical power grid.

In some embodiments, and still referring to FIG. 3, system 300 may include a computing device 312. Computing device 312 may include any computing device as described in this disclosure, including without limitation a microcontroller, microprocessor, digital signal processor (DSP) and/or system on a chip (SoC) as described in this disclosure. Computing device 312 may include, be included in, and/or communicate with a mobile device such as a mobile telephone or smartphone. Computing device 312 may include a single computing device operating independently, or may include two or more computing device operating in concert, in parallel, sequentially or the like; two or more computing devices may be included together in a single computing device or in two or more computing devices. Computing device 312 may interface or communicate with one or more additional devices as described below in further detail via a network interface device. Network interface device may be utilized for connecting computing device 312 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 312 may include but is not limited to, for example, a computing device or cluster of computing devices in a first location and a second computing device or cluster of computing devices in a second location. Computing device 312 may include one or more computing devices dedicated to data storage, security, distribution of traffic for load balancing, and the like. Computing device 312 may distribute one or more computing tasks as described below across a plurality of computing devices of computing device, which may operate in parallel, in series, redundantly, or in any other manner used for distribution of tasks or memory between computing devices. Computing device 312 may be implemented using a "shared nothing" architecture in which data is cached at the worker, in an embodiment, this may enable scalability of system 100 and/or computing device.

With continued reference to FIG. 3, computing device 312 may be designed and/or configured to perform any method, method step, or sequence of method steps in any embodiment described in this disclosure, in any order and with any degree of repetition. For instance, computing device 312 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 312 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, computing device 312 may monitor a power grid of the power recharging station and actively switch between charging electric aircraft 300 and charging one or more batteries in power storage unit 306. In one embodiment, computing device 312 may monitor the power grid of the recharging station as well as an external power grid. Computing device 312 may route power from power storage unit 306 to an external power grid to power said external power grid. In some embodiments, computing device 312 may be connected to electric aircraft 300 physically or wirelessly. In some embodiments, computing device 312 may be connected to rechargeable component 302 and power supply unit 304. Computing device 312 may monitor the power grid of the recharging station and its various electrical components. Computing device 312 may be configured to perform a variety of functions and procedures.

In some embodiments, the computing device 312 may assist with electric aircraft 300 by helping to guide electric aircraft 300 to a landing pad. In one embodiment, computing device 312 may make and send a landing plan to electric aircraft 300. In another embodiment, computing device 312 may receive landing data from electric aircraft 300 and instruct rechargeable component 310 and power supply unit 304 to power up in anticipation of charging electric aircraft 300. In some embodiments, computing device 312 may receive a battery status from electric aircraft 300, either or both while charging the electric aircraft 300 and while electric aircraft 300 is in the air. Computing device 312 may also receive and report health and damage status of electric aircraft 300. In some embodiments, computing device 312 may send estimated charge times and health and status of rechargeable component 302 to electric aircraft 300. In some embodiments, computing device 312 may also include a temperature sensor. Computing device 312 may use the temperature data gathered from the temperature sensor to track the heating and cooling of rechargeable component 302 and electric aircraft 300. In one embodiment, computing device 312 may coordinate the cooling of electric aircraft 300 to prevent it from overheating in various scenarios, such as being charged. In some embodiments, computing device 312 may be configured to monitor and track the state of health of the batteries, which is discussed in further detail with regards to FIG. 7 below.

In some embodiments, computing device 312 may send flight plans to electric aircraft 300. In some embodiments, this may occur while electric aircraft 300 is connected and charging through rechargeable component 302. In other embodiments, computing device 312 may send flight plans to electric aircraft 300 while it is airborne. In some embodiments, the flight plans may be real-time and updated based on, but not limited to, battery status of electric aircraft 300, battery and health status of rechargeable component 302, charge times, weather conditions, and travel times. In some embodiments, computing device 312 may send flight plans and other flight information to another recharging station. Computing device 312 may communicate between two or more recharging stations to create an efficient flight plan and charging plan for electric aircraft 300. In some embodiments, computing device 312 may send software and firmware updates to electric aircraft 300. Electric aircraft 300 may similarly request software and firmware updates from computing device 312. Computing device 312 may also update the software and firmware of rechargeable component 302. In some embodiments, the status of the firmware and software updates of electric aircraft 300 and rechargeable component 302 may be reported by computing device 312. In some embodiments, computing device 312 may update the software and firmware of individual components of electric aircraft 300.

In some embodiments, computing device 312 may transfer many forms of data to and from electric aircraft 300, either wired or wirelessly. These forms of data may include, but are not limited to, flight plan updates, software updates, firmware updates, flight records, charge data, weather data, traffic data, or other data, as described in detail below in FIG. 9.

Figure 4:
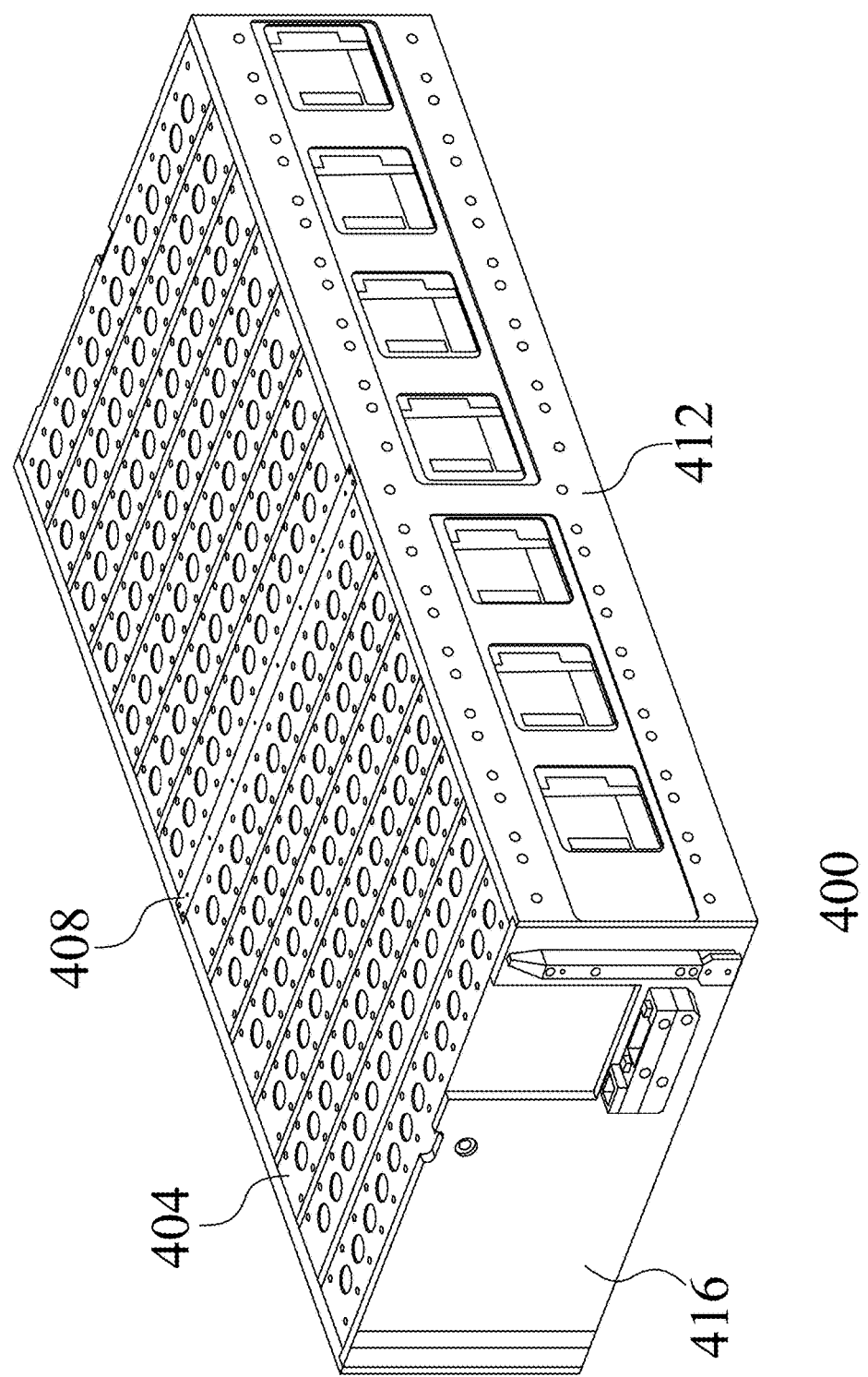
FIG. 4 is a front view of an exemplary embodiment of a battery pack.

FIG. 4 illustrates an exemplary embodiment of a battery pack 400 that may be housed in the power storage unit to store power. Battery pack 400 may be a power storing device that is configured to store electrical energy in the form of a plurality of battery modules, which themselves may be comprised of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not comprise wires may be prefabricated terminals of a first gender that mate with a second terminal with a second gender. Battery cells may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 400 may include at least 196 battery cells in series and at least 18 battery cells in parallel. This is, as someone of ordinary skill in the art would appreciate, only an example and battery pack 400 may be configured to have a near limitless arrangement of battery cell configurations.

With continued reference to FIG. 4, battery pack 400 may include a plurality of battery modules 404. The battery modules may be wired together in series and in parallel. Battery pack 400 may include a center sheet 408 which may include a thin barrier. The barrier may include a fuse connecting battery modules on either side of center sheet 408. The fuse may be disposed in or on center sheet 408 and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may comprise a thermal fuse, mechanical fuse, blade fuse, expulsion fuse, spark gap surge arrestor, varistor, or a combination thereof.

Battery pack 400 may also include a side wall 412 which may include a laminate of a plurality of layers configured to thermally insulate the plurality of battery modules 404 from external components of battery pack 400. Side wall 412 layers may include materials which possess characteristics suitable for thermal insulation such as fiberglass, air, iron fibers, polystyrene foam, and thin plastic films. Side wall 412 may additionally or alternatively electrically insulate the plurality of battery modules 404 from external components of battery pack 400 and the layers of which may include polyvinyl chloride (PVC), glass, asbestos, rigid laminate, varnish, resin, paper, Teflon, rubber, and mechanical lamina. Center sheet 408 may be mechanically coupled to side wall 412. Side wall 412 may include a feature for alignment and coupling to center sheet 408. This feature may comprise a cutout, slots, holes, bosses, ridges, channels, and/or other undisclosed mechanical features, alone or in combination.

Battery pack 400 may also include an end panel 416 having a plurality of electrical connectors and further configured to fix battery pack 400 in alignment with at least a side wall 412. End panel 416 may include a plurality of electrical connectors of a first gender configured to electrically and mechanically couple to electrical connectors of a second gender. End panel 416 may be configured to convey electrical energy from battery cells to at least a portion of an eVTOL aircraft. Electrical energy may be configured to power at least a portion of an eVTOL aircraft or comprise signals to notify aircraft computers, personnel, users, pilots, and any others of information regarding battery health, emergencies, and/or electrical characteristics. The plurality of electrical connectors may comprise blind mate connectors, plug and socket connectors, screw terminals, ring and spade connectors, blade connectors, and/or an undisclosed type alone or in combination. The electrical connectors of which end panel 416 comprises may be configured for power and communication purposes.

A first end of end panel 416 may be configured to mechanically couple to a first end of a first side wall 412 by a snap attachment mechanism, similar to end cap and side panel configuration utilized in the battery module. To reiterate, a protrusion disposed in or on end panel 416 may be captured, at least in part, by a receptacle disposed in or on side wall 412. A second end of end panel 416 may be mechanically coupled to a second end of a second side wall 412 in a similar or the same mechanism.

Figure 5:
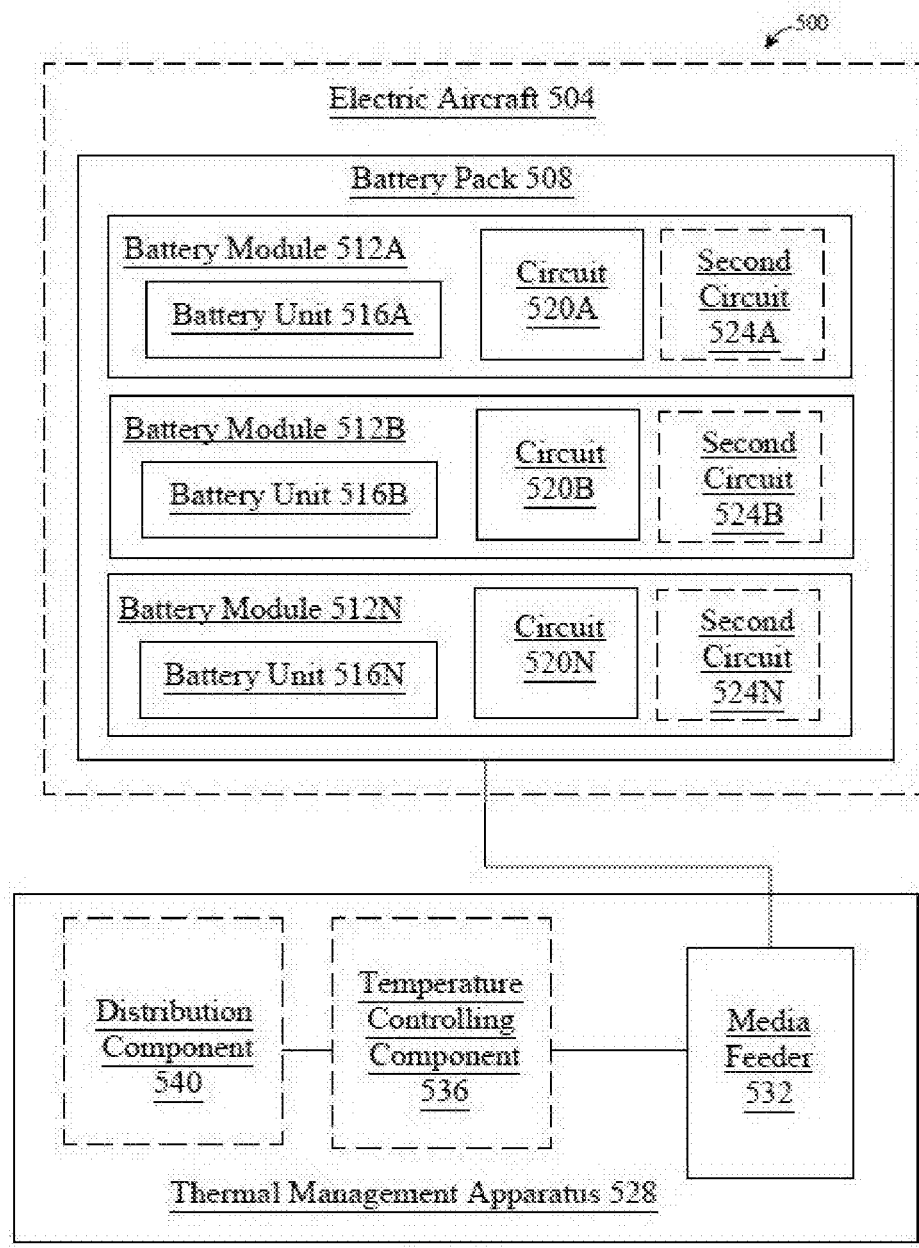
FIG. 5 is a block diagram of a thermal management system for a battery pack.

FIG. 5 illustrates an exemplary embodiment of a thermal management system 500 for a battery pack 508 that may be used to charge an electric aircraft 504. Thermal management system 500 may be configured to facilitate the flow of media to cool battery pack 508 of electric aircraft 504. Thermal management system 500 may include battery pack 508, a plurality of battery modules 512A-N, at least a portion of a battery unit 516A-N, a plurality of first circuits 520A-N, a plurality of second circuits 524A-N, thermal management apparatus 528, media feeder 532, temperature controlling component 536, distribution component 540, or any combination thereof.

Continuing to refer to FIG. 5, thermal management system 500 may be designed and configured to include battery pack 508 mechanically coupled to electric aircraft 504. Battery pack 508 may be designed and configured to power electric aircraft 504 to meet the demands of a flight mission, wherein the flight mission includes a takeoff and landing. Battery pack 508 may be designed and configured to include a plurality of battery modules 512A-N. As an exemplary embodiment, FIG. 5 illustrates 3 battery modules 512A-N housed within battery pack 508; however, a person of ordinary skill in the art would understand that any number of battery modules 512A-N may be housed within battery pack 508. Each battery module of the plurality of battery modules 512A-N may include one or more battery units 516A-N. Each battery module of the plurality of battery modules 512A-N may be configured to house and/or encase at least a portion of each battery unit 516A-N. Battery units 516A-N may be configured to be contained within each battery module of the plurality of battery modules 512A-N, wherein each battery unit 516A-N is disposed between each first circuit 520A-N and each second circuit 524A-N. As an exemplary embodiment, FIG. 5 illustrates one battery unit 516A-N housed within each battery module of the plurality of battery modules 512A-N; however, a person of ordinary skill in the art would understand that any number of battery units 516A-N may be housed within battery module 512A-N. In embodiments, each battery unit 516A-N is configured to provide power to at least a portion of electric aircraft 504.

Still referring to FIG. 5, each battery unit 516A-N may include a plurality of battery cells, wherein the plurality of battery cells may be aligned in a first row and a second row. A "battery cell" as described herein, is a single anode and cathode separated by electrolyte, wherein the cell produces voltage and current. Each battery cell of the plurality of battery cells may have a shape, such as a cylinder, and may include a radius. Each battery cell of the plurality of battery cells may comprise an electrochemical reaction configured to produce electrical energy. For example, and without limitation, the electrical energy produced by one or more battery cells of the plurality of battery cells may be sufficient to power at least a portion of electric aircraft 504, such as an eVTOL aircraft. Each battery cell of the plurality of battery cells may comprise a primary battery or a secondary battery. Each battery cell of the plurality of battery cells may include electrochemical cells, galvanic cells, electrolytic cells, fuel cells, flow cells, voltaic cells, and/or any combination thereof. The electrolyte of each battery cell may include any material, such as a liquid electrolyte or a paste electrolyte. For example, and without limitation, the electrolyte of each battery cell of the plurality of battery cells may include molten salt or ammonium chloride. Persons skilled in the art, upon reviewing the entirety of this disclosure, will be aware of various cells that may be used as the plurality of battery cells consistently with this disclosure.

Continuing to refer to FIG. 5, each battery unit 516A-N further includes a thermal conduit. In embodiments, the thermal conduit may include a first side and a second opposite opposing side with a thickness between the first and second surfaces. Further, the thermal conduit may include a first and second opposite, opposing ends. A "thermal conduit" as described herein, is a thermally conductive component separating each row of the battery cells within a respective battery unit 516. The thermal conduit is configured to include a first end and a second end, wherein the second end is opposite the first end of the thermal conduit. The thermal conduit may be configured to be coupled to each battery unit of the plurality of battery units 516A-N. According to embodiments, the thermal conduit may have a height that is equal to or less than the height of one or more battery cells. In embodiments, the thermal conduit may be composed of any suitable material. In an embodiment, the thermal conduit may be composed utilizing aluminum. For example, and without limitation, the thermal conduit may be composed utilizing a plurality of manufacturing processes, such as extrusion, casting, subtractive manufacturing processes, and the like. As a further non-limiting example, the thermal conduit may be composed utilizing injection molding. Injection molding may comprise injecting a liquid material into a mold and letting the liquid material solidify, taking the shape of the mold in a hardened form, the liquid material may include liquid crystal polymer, polypropylene, polycarbonate, acrylonitrile butadiene styrene, polyethylene, nylon, polystyrene, polyether ether ketone, and the like, and/or any combination thereof. The thermal conduit may be configured to cool the plurality of battery cells of the respective battery unit 516, wherein the battery cells are cooled by allowing a media to flow though the thermal conduit. The "media", as used in this disclosure, is any fluid and/or gas that may transfer the heat generated by each battery unit of the plurality of battery units 516A-N out of battery pack 508 and electric aircraft 504. In an embodiment, for example and without limitation, the media may include a fluid, such as water, heat-transfer oil, molten salt, and the like. As a further example and without limitation, the media may include a gas, such as air, steam, compressed air, and the like. Persons skilled in the art, upon reviewing the entirety of this disclosure, will be aware of various fluids and/or gases that may be used as the media consistently with this disclosure. Further, persons skilled in the art, upon reviewing the entirety of this disclosure, will be aware of various thermally conductive components that may be used as the thermal conduit consistently with this disclosure.

With continued reference to FIG. 5, each battery module of the plurality of battery modules 512A-N may further include first circuit 520A-N mechanically coupled to the at least a portion of a battery unit 516A-N. The "first circuit", as described in this disclosure, is a circuit substantially aligned with the first end of the thermal conduit of each battery unit of the plurality of battery units 516A-N. First circuit 520A-N may include any component configured to facilitate the flow of media to battery pack 508 by utilizing an electrical current. Persons skilled in the art, upon reviewing the entirety of this disclosure, will be aware of various circuits that may be used as the first circuit consistently with this disclosure. Further, each battery module of the plurality of battery modules 512A-N may include second circuit 524A-N mechanically coupled to the at least portion of a battery unit 516A-N. The "second circuit" as described in this disclosure, is a circuit substantially aligned with the second end of the thermal conduit of each battery unit of the plurality of battery units 516A-N. Second circuit 516A-N may include any component configured to facilitate the flow of media out of battery pack 508 by utilizing an electrical current. Persons skilled in the art, upon reviewing the entirety of this disclosure, will be aware of various circuits that may be used as the second circuit consistently with this disclosure.

Continuing to refer to FIG. 5, assembly 500 may be further designed and configured to include thermal management apparatus 528. Thermal management apparatus 528 may be in any location such that it may be coupled to battery pack 508 on electric aircraft 504 when the aircraft is not in flight, such as when the aircraft is grounded, taxiing, parked, and the like. For example, and without limitation, the location may include on the ground, on a platform, any raised structure, coupled to a recharging pad infrastructure, and the like. Persons skilled in the art, upon reviewing the entirety of this disclosure, will be aware of various locations that may be used location of the ground cooling apparatus consistently with this disclosure.

With continued reference to FIG. 5, thermal management apparatus 528 may be configured to include media feeder 532. "Media feeder" as used in this disclosure, is a component that mechanically couples to first circuit 520A-N of plurality of battery modules 512A-N, wherein mechanically coupling creates an open passage for the media to transport into first circuit 520-N of plurality of battery modules 512A-N. Media feeder 532 may be configured to transport the media to plurality of battery modules 512A-N when mechanically coupled to the respective first circuit 520A-N. In an embodiment, media feeder 532 may be mechanically coupled to first circuit 520A-N when electric aircraft 504 is not in flight, such as when taxiing, recharging, parked, and the like. In an embodiment, media feeder 532 may be coupled to a recharging infrastructure, the natural ground, any platform, and/or any structure, wherein media feeder 532 may be accessible to mechanically coupled to plurality of battery modules 512A-N of electric aircraft 104. For example, and without limitation, media feeder 532 may include any tubing, piping, hose, and/or any other hollow component capable of facilitating the transport of the media from ground cooling apparatus 528 to plurality of battery modules 512A-N. Persons skilled in the art, upon reviewing the entirety of this disclosure, will be aware of various components that may be used as the media feeder consistently with this disclosure.

Still referring to FIG. 5, thermal management apparatus 528 may be further configured to include temperature controlling component 536. "Temperature controlling component", as used in this disclosure, is a component that is capable of raising and/or lowering the temperature of the media. For example, and without limitation, temperature controlling component 536 may include a heater, cooler, thermolater, a temperature control unit, chiller, and/or the like. Temperature controlling component 536 may be configured to adjust the media to a temperature that will efficiently cool battery pack 508 including plurality of battery cells 512A-N of electric aircraft 504. In an embodiment, temperature controlling component 536 may be mechanically coupled to media feeder 532. Further, in an embodiment, once the media reaches a threshold temperature, the media will be transported to plurality of battery modules 512A-N of electric aircraft 504 through media feeder 532. Persons skilled in the art, upon reviewing the entirety of this disclosure, will be aware of various components that may be used as the temperature controlling component consistently with this disclosure.

Continuing to refer to FIG. 5, thermal management apparatus 528 may be further configured to include distribution component 540. "Distribution component", as used in this disclosure, is a component that intakes the media into thermal management apparatus 528. For example, and without limitation, distribution component 540 may include a compressor, a fan, a pump, and/or the like. In an embodiment, distribution component 540 may be mechanically coupled to temperature controlling component 536. In a further embodiment, distribution component 540 may be configured to supply the media to battery pack 508 including plurality of battery modules 512A-N of electric aircraft 504, wherein distribution component 540 is configured to transfer the media to temperature controlling component 536. Persons skilled in the art, upon reviewing the entirety of this disclosure, will be aware of various components that may be used as the distribution component consistently with this disclosure.

Figure 6:
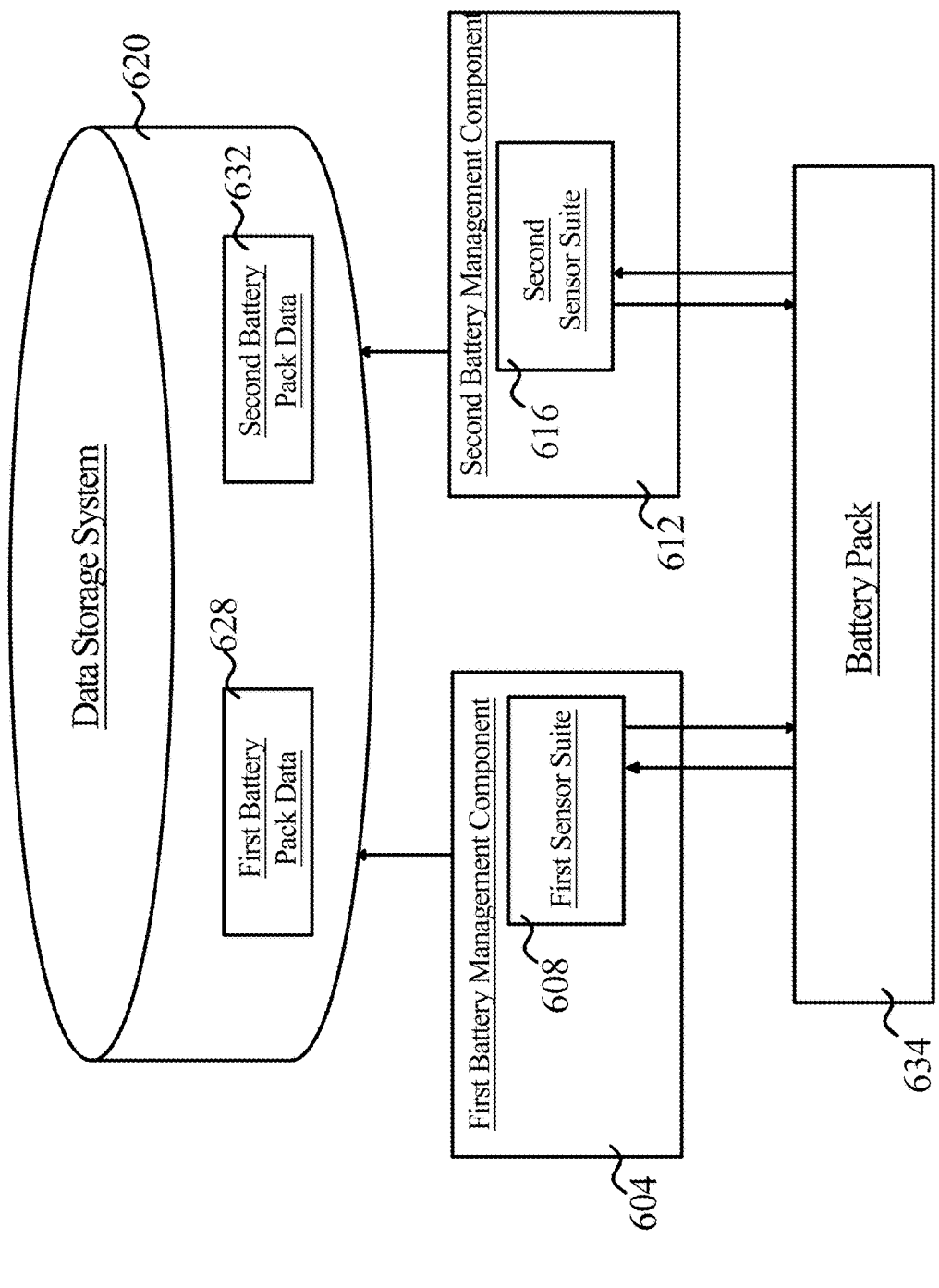
FIG. 6 is a block diagram of a battery charging management system.

Referring now to FIG. 6, an embodiment of battery management system 600 is presented. Battery management system 600 may be integrated in a battery pack configured for use in an electric aircraft. The battery management system 600 may be integrated in a portion of the battery pack or subassembly thereof. Battery management system 600 includes first battery management component 604 disposed on a first end of the battery pack. One of ordinary skill in the art will appreciate that there are various areas in and on a battery pack and/or subassemblies thereof that may include first battery management component 604. First battery management component 604 may take any suitable form. In a non-limiting embodiment, first battery management component 604 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 604 may be soldered or otherwise electrically connected to a circuit board. First battery management component may be disposed directly over, adjacent to, facing, and/or near a battery module and specifically at least a portion of a battery cell. First battery management component 604 includes first sensor suite 608. First sensor suite 608 is configured to measure, detect, sense, and transmit first plurality of battery pack data 628 to data storage system 620, which will be disclosed in further detail with reference to FIG. 6.

Referring again to FIG. 6, battery management system 600 includes second battery management component 612. Second battery management component 612 is disposed in or on a second end of battery pack 634. Second battery management component 612 includes second sensor suite 616. Second sensor suite 616 may be consistent with the description of any sensor suite disclosed herein. Second sensor suite 616 is configured to measure second plurality of battery pack data 632. Second plurality of battery pack data 632 may be consistent with the description of any battery pack data disclosed herein. Second plurality of battery pack data 632 may additionally or alternatively include data not measured or recorded in another section of battery management system 600. Second plurality of battery pack data 632 may be communicated to additional or alternate systems to which it is communicatively coupled. Second sensor suite 616 includes a humidity sensor consistent with any humidity sensor disclosed herein.

With continued reference to FIG. 6, first battery management component 604 disposed in or on battery pack 634 may be physically isolated from second battery management component 612 also disposed on or in battery pack 634. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 604 and second battery management component 608 may perform the same or different functions in battery management system 600. In a non-limiting embodiment, the first and second battery management components perform the same, and therefore redundant functions. If, for example, first battery management component 604 malfunctions, in whole or in part, second battery management component 608 may still be operating properly and therefore battery management system 600 may still operate and function properly for electric aircraft in which it is installed. Additionally, or alternatively, second battery management component 608 may power on while first battery management component 604 is malfunctioning. One of ordinary skill in the art would understand that the terms "first" and "second" do not refer to either "battery management components" as primary or secondary. In non-limiting embodiments, first battery management component 604 and second battery management component 608 may be powered on and operate through the same ground operations of an electric aircraft and through the same flight envelope of an electric aircraft. This does not preclude one battery management component, first battery management component 604, from taking over for second battery management component 608 if it were to malfunction. In non-limiting embodiments, the first and second battery management components, due to their physical isolation, may be configured to withstand malfunctions or failures in the other system and survive and operate. Provisions may be made to shield first battery management component 604 from second battery management component 608 other than physical location such as structures and circuit fuses. In non-limiting embodiments, first battery management component 604, second battery management component 608, or subcomponents thereof may be disposed on an internal component or set of components within battery pack 634.

Referring again to FIG. 6, first battery management component 604 is electrically isolated from second battery management component 608. "Electrical isolation", for the purposes of this disclosure, refer to a first system's separation of components carrying electrical signals or electrical energy from a second system's components. First battery management component 604 may suffer an electrical catastrophe, rendering it inoperable, and due to electrical isolation, second battery management component 608 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 6, battery management system 600 includes data storage system 620. Data storage system 620 is configured to store first plurality of battery pack data 628 and second plurality of battery pack data 632. Data storage system 620 may include a database. Data storage system 620 may include a solid-state memory or tape hard drive. Data storage system 620 is communicatively coupled to first battery management component 604 and second battery management component 612 and configured to receive electrical signals related to physical or electrical phenomenon measured and store those electrical signals as first battery pack data 628 and second battery pack data 632, respectively. Alternatively, data storage system 620 may include more than one discrete data storage systems that are physically and electrically isolated from each other. In this non-limiting embodiment, each of first battery management component 604 and second battery management component 612 may store first battery pack data 628 and second battery pack data 632 separately. One of ordinary skill in the art would understand the virtually limitless arrangements of data stores with which battery management system 600 could employ to store the first and second plurality of battery pack data.

Referring again to FIG. 6, data storage system 620 may store first plurality of battery pack data 628 and second plurality of battery pack data 632. First plurality of battery pack data 628 and second plurality of battery pack data 632 may include total flight hours battery pack 634 and or electric aircraft have been operating. The first and second plurality of battery pack data may include total energy flowed through battery pack 634. Data storage system 620 may be communicatively coupled to sensors that detect, measure and store energy in a plurality of measurements which may include current, voltage, resistance, impedance, coulombs, watts, temperature, or a combination thereof. Additionally or alternatively, data storage system 620 may be communicatively coupled to a sensor suite consistent with this disclosure to measure physical and/or electrical characteristics. Data storage system 620 may be configured to store first battery pack data 628 and second battery pack data 632 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 620 may store the first and second battery pack data that includes an upper voltage threshold and lower voltage threshold consistent with this disclosure. First battery pack data 628 and second battery pack data 632 may include a moisture level threshold. The moisture level threshold may include an absolute, relative, and/or specific moisture level threshold.

Figure 7:
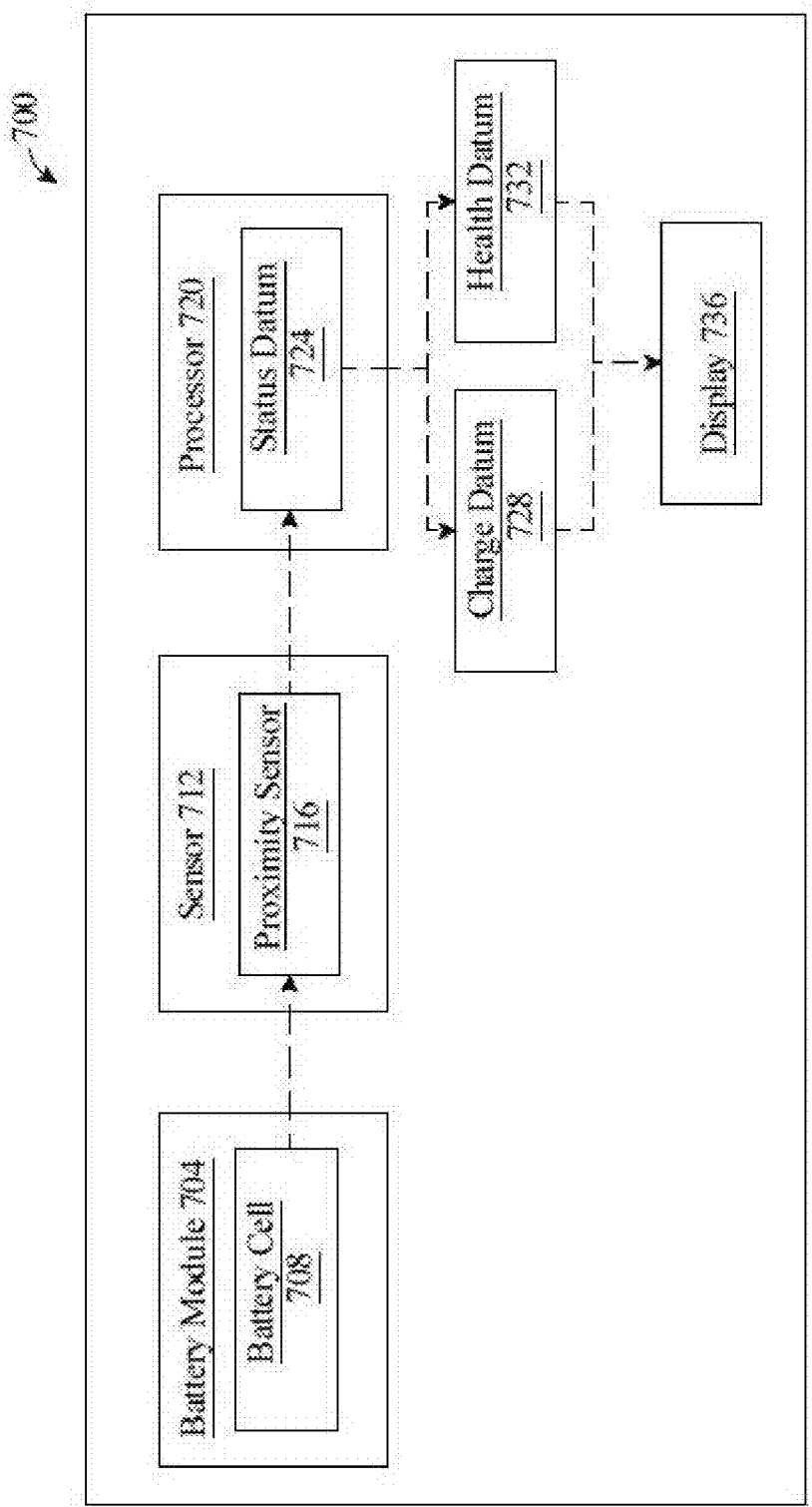
FIG. 7 is a block diagram of an exemplary embodiment of a health and charge monitoring system.

Referring now to FIG. 7, an exemplary embodiment of a system 700 for state determination of a battery module configured for use in an electric vehicle is illustrated. System 700 may communicate with a battery management system as described above. System 700 may send and receive data to the recharging station. In some embodiments, system 700 may send and receive data from a battery management system to optimize recharging of an electric aircraft via the recharging station. In some embodiments, system 700 may include a computing device. The computing device may include any computing device as described in this disclosure. The computing device could include, be included in, and/or share any component with any other computing device and/or system described in this disclosure. System 700 and any one or more computing devices may be designed and/or configured to perform any method, method step, or sequence of method steps in any embodiment described in this disclosure, in any order and with any degree of repetition. For instance, system 700 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. System 700 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 7, system 700 for state determination of a battery module configured for use in an electric vehicle is presented in block diagram form. System 700 may include a battery module 704. Battery module 704 may include a battery cell 708. System 700 may include sensor 712. Sensor 712 may include proximity sensor 716. System 700 may include processor 720. Processor 720 may include status datum 724. Status datum 724 may be configured to communicate with charge datum 728 and health datum 732. Processor 720 may be configured to output data on display 736. Additional disclosure related to systems for state determination of a battery module may be found in co-owned U.S. Patent Application entitled "SYSTEM AND METHOD FOR STATE DETERMINATION OF A BATTERY MODULE CONFIGURED FOR USED IN AN ELECTRIC VEHICLE", having U.S. patent application Ser. No. 17/241,396, the entirety of which is incorporated herein by reference.

Figure 8:
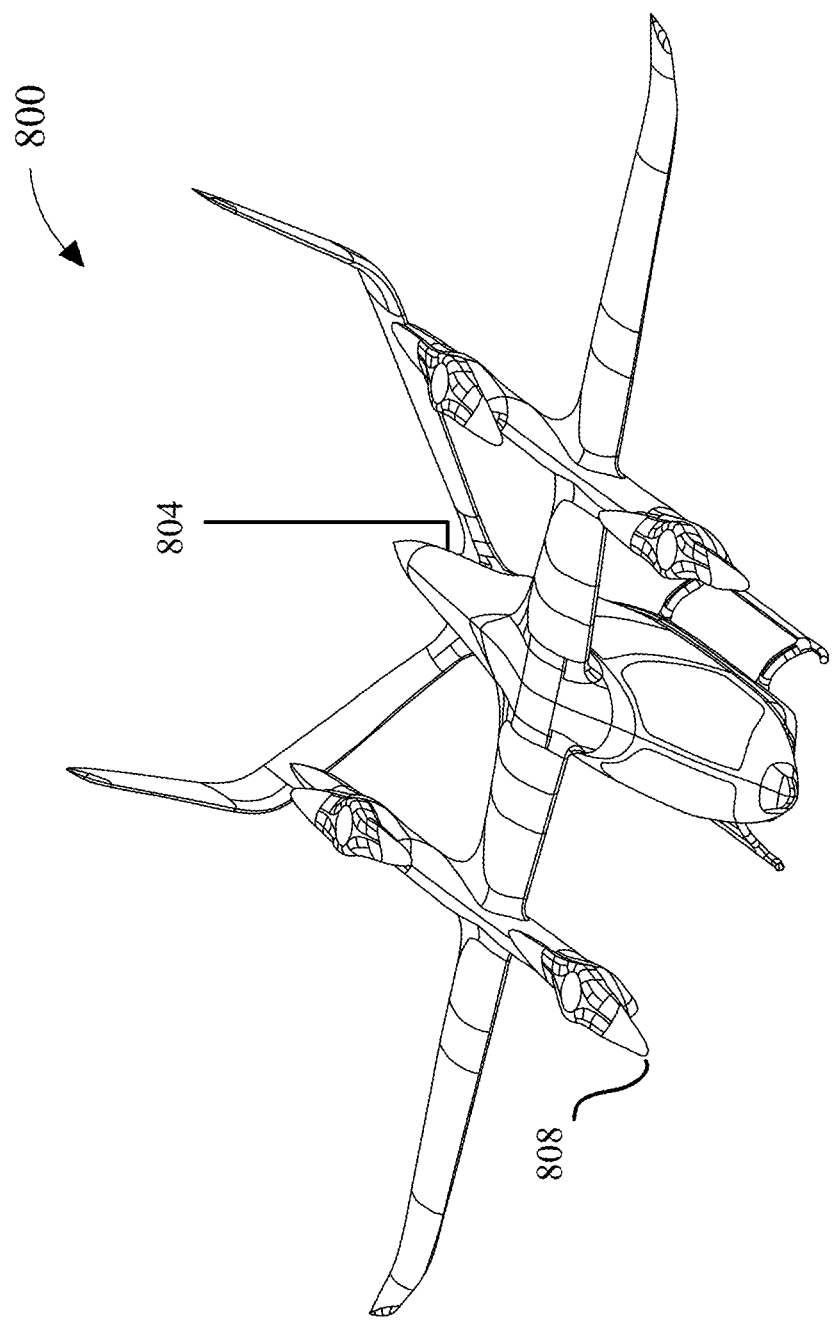
FIG. 8 is a front view of an exemplary embodiment of an eVTOL.

Referring now to FIG. 8, an embodiment of an electric aircraft 800 is presented. Electric aircraft 800 may be configured to be positioned on the recharging station. In some embodiments, electric aircraft 800 may be configured to receive power and be charged by the recharging station. Electric aircraft 800 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 8, a number of aerodynamic forces may act upon the electric aircraft 800 during flight. Forces acting on an electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which is caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components is essential to optimize the weight. To save energy, it may be useful to reduce weight of components of an electric aircraft 800, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Referring still to FIG. 8, Aircraft may include at least a vertical propulsor 804 and at least a forward propulsor 808. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 804 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 8, at least a forward propulsor 808 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 804 and at least a forward propulsor 808 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 8, during flight, a number of forces may act upon the electric aircraft. Forces acting on an aircraft 800 during flight may include thrust, the forward force produced by the rotating element of the aircraft 800 and acts parallel to the longitudinal axis. Drag may be defined as a rearward retarding force which is caused by disruption of airflow by any protruding surface of the aircraft 800 such as, without limitation, the wing, rotor, and fuselage. Drag may oppose thrust and acts rearward parallel to the relative wind. Another force acting on aircraft 800 may include weight, which may include a combined load of the aircraft 800 itself, crew, baggage and fuel. Weight may pull aircraft 800 downward due to the force of gravity. An additional force acting on aircraft 800 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 9:
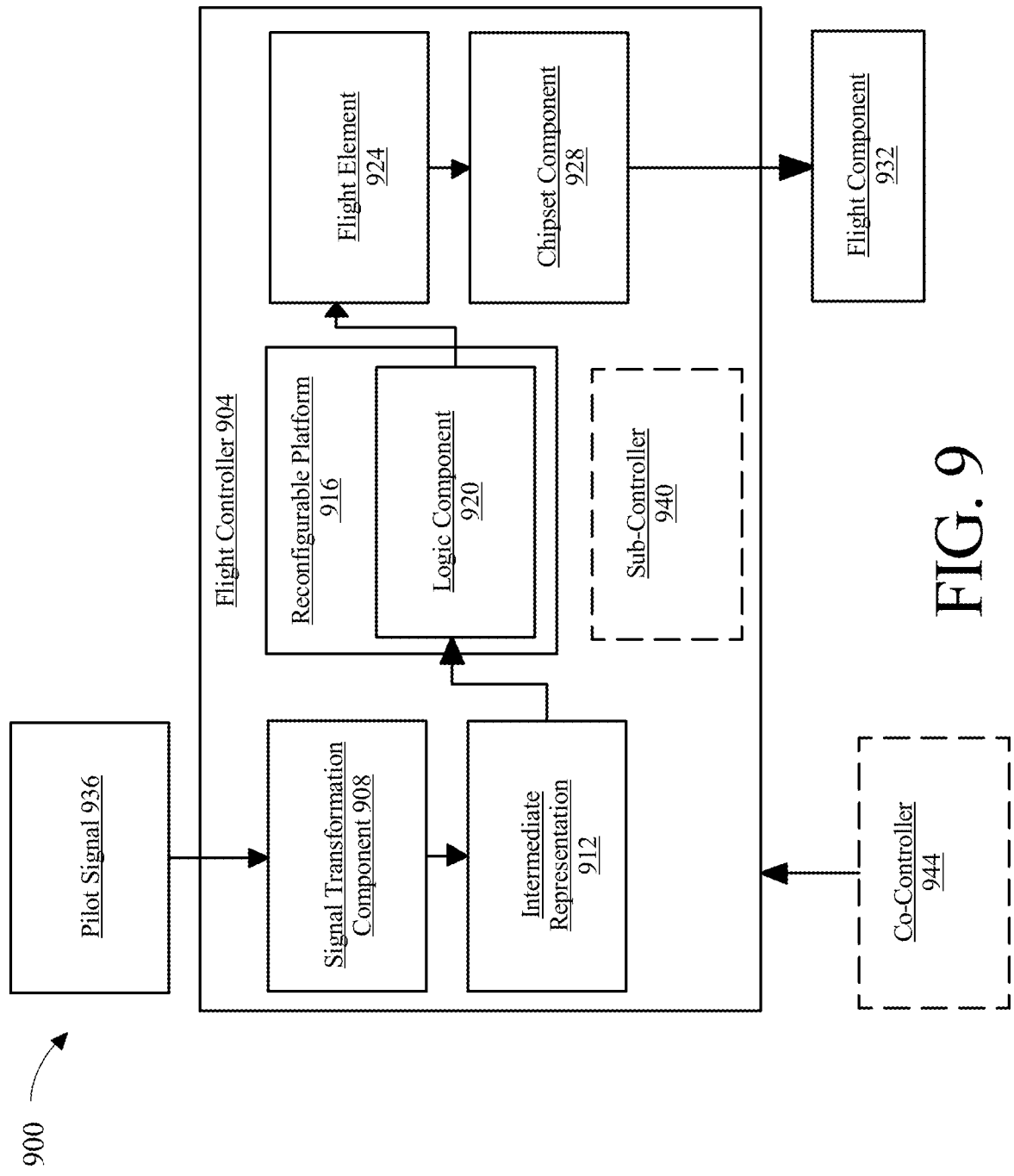
FIG. 9 is a flowchart of illustrating an exemplary embodiment of a flight controller system.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that may be moved or adjusted to affect one or more flight elements. For example, flight component 932 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one or more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In some embodiments, and with continued reference to FIG. 9, any data, software, and/or firmware that may be usable/storable by flight controller 905 may be exchanged with the recharging station. In some embodiments, the data exchanged may include flight plans, flight records, current navigational status, and/or commands from the recharging station. In some embodiments, the commands from the recharging station may include commands to alter, steer, or navigate an electric aircraft. In other embodiments, the data exchanged between flight controller 905 and the recharging station may include a battery state of an electric aircraft. In some embodiments, the battery state may be tracked by any battery management system as described above.

Figure 10:
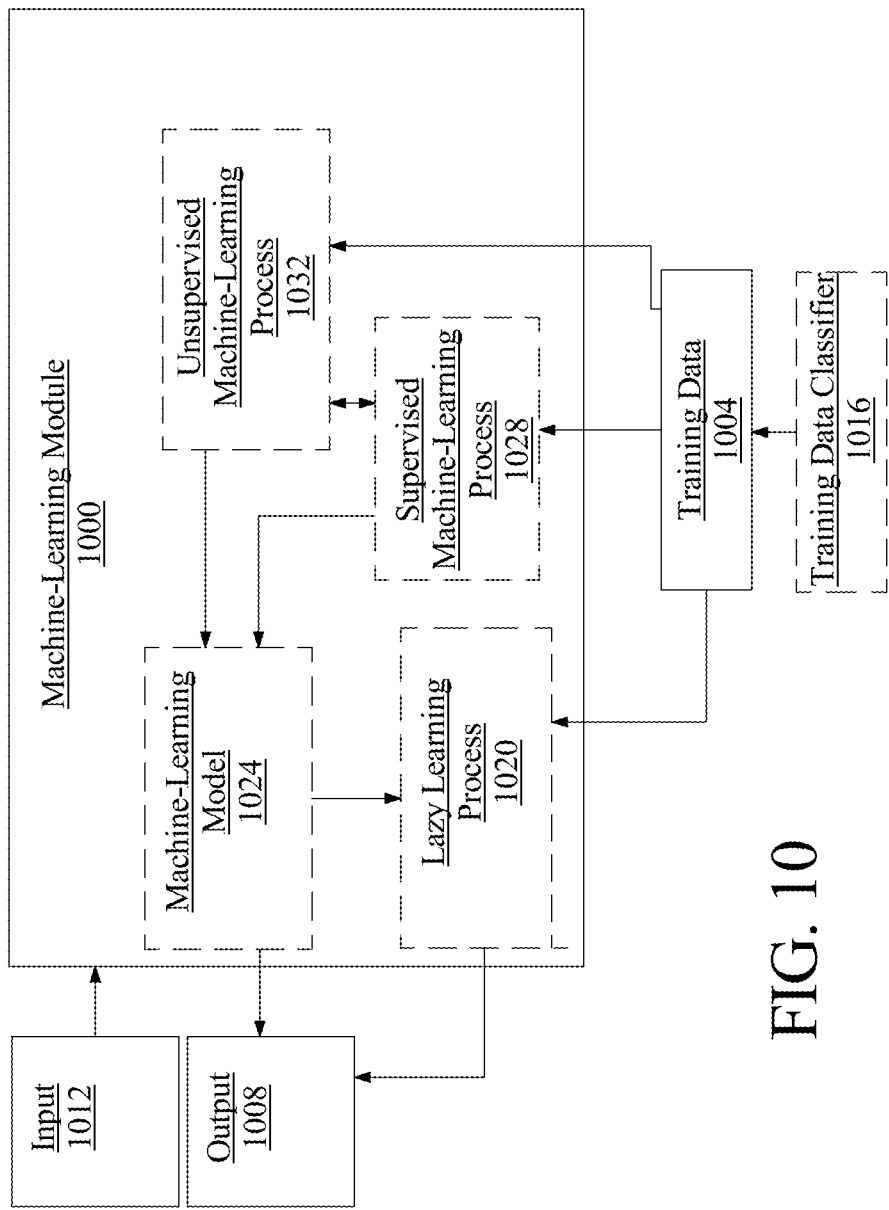
FIG. 10 is a flowchart of an exemplary machine learning module.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
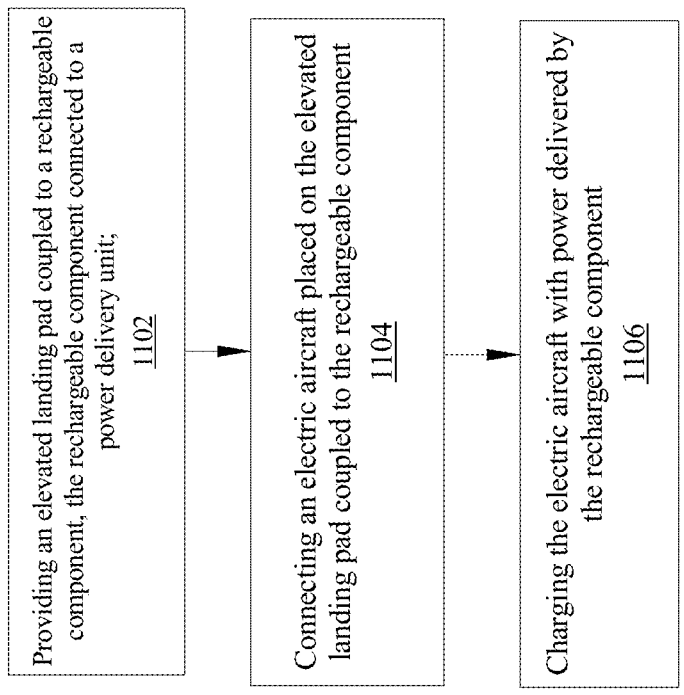
FIG. 11 is a flow diagram illustrating an exemplary embodiment of a method of recharging an electric aircraft.

FIG. 11 illustrates a flowchart 1100 for a method of recharging an electric aircraft. At step 1102, an elevated landing pad coupled to a rechargeable component is provided. In one embodiment, the elevated landing pad may include a helideck or helipad. The elevated landing pad may include an integrated deicing system. In one embodiment, the integrated deicing system may clear obstruction from snow, ice, sleet, hail, or other forms of precipitation. The elevated landing pad may also include an integrated lighting system. The integrated lighting system may provide night vision goggle compatibility. In some embodiments, providing an elevated landing pad may include the rapid construction of modular housing units to provide an elevated support for the elevated landing pad. In some embodiments, the elevated landing pad may be provided in densely populated cities. The elevated landing pad may be constructed on top of a pre-existing building to clear the landing zone of any obstruction. In other embodiments, the elevated landing pad may be constructed in a rural area isolated from cities and buildings. In some embodiments, the elevated landing pad may be provided in a location along a flight path of an electric vehicle.

At step 1104, an electric aircraft placed on the elevated landing pad is connected to the rechargeable component. In one embodiment, the connection between the rechargeable component and the electric aircraft may be wired. In another embodiment, this connection may be wireless. In some embodiments, the connection between the electric aircraft and the rechargeable component may be automated.

At step 1106, the electric aircraft is charged with the power delivered by the rechargeable component. The electric aircraft may be rapidly charged to full capacity as soon as possible. In other embodiments, the electric aircraft may have a scheduled charge that adaptably increases or decreases the rate at which the electric aircraft is charged. In one embodiment, the electric aircraft may be charged at a slow and steady rate overnight. In one embodiment, the electric aircraft may trickle charge so as to maintain the health of the electric aircraft's battery.

Figure 12:
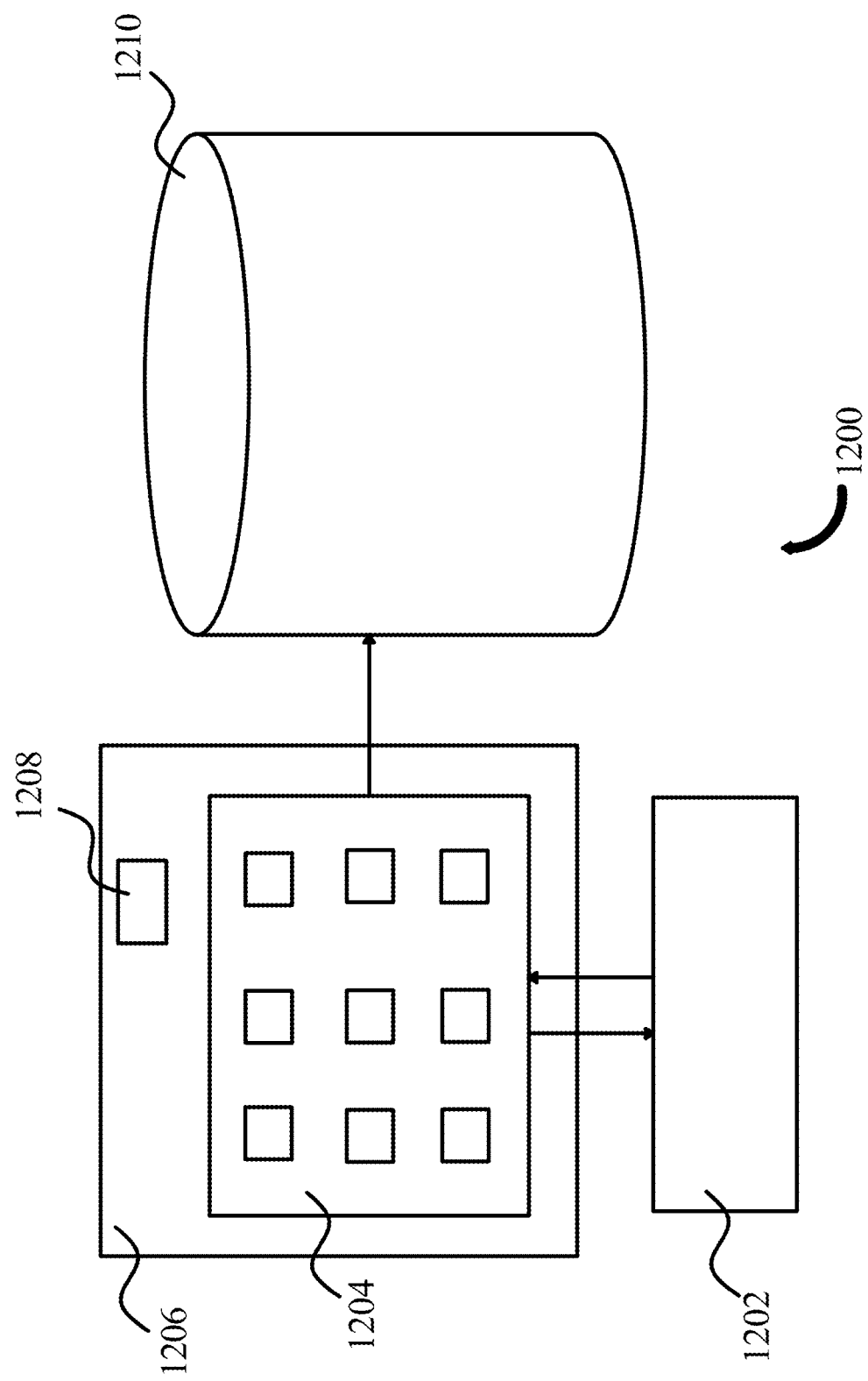
FIG. 12 is a block diagram of an exemplary embodiment of a computing system.

Referring now to FIG. 12, an exemplary embodiment of a system 1200 for monitoring and transferring data to and from an electric aircraft is illustrated. System 1200 includes a computing device 1202. The computing device 1202 may include any computing device as described in this disclosure, including without limitation a microcontroller, microprocessor, digital signal processor (DSP) and/or system on a chip (SoC) as described in this disclosure. The computing device 1202 may include, be included in, and/or communicate with a mobile device such as a mobile telephone or smartphone. The computing device 1202 may include a single computing device operating independently, or may include two or more computing device operating in concert, in parallel, sequentially or the like; two or more computing devices may be included together in a single computing device or in two or more computing devices. The computing device 1202 may interface or communicate with one or more additional devices as described below in further detail via a network interface device 1206. Network interface device 1206 may be utilized for connecting the computing device 1202 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The computing device may include but is not limited to, for example, a computing device or cluster of computing devices in a first location and a second computing device or cluster of computing devices in a second location. The computing device 1202 may include one or more computing devices dedicated to data storage, security, distribution of traffic for load balancing, and the like. The computing device 1202 may distribute one or more computing tasks as described below across a plurality of computing devices of computing device, which may operate in parallel, in series, redundantly, or in any other manner used for distribution of tasks or memory between computing devices. the computing device may be implemented using a "shared nothing" architecture in which data is cached at the worker, in an embodiment, this may enable scalability of system 1200 and/or computing device 1202.

With continued reference to FIG. 12, the computing device 1202 may be designed and/or configured to perform any method, method step, or sequence of method steps in any embodiment described in this disclosure, in any order and with any degree of repetition. For instance, the computing device 1202 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The computing device 1202 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

The computing device 1202 may include a display screen 1204. The display screen 1204 may be of any width, height, thickness, and brightness. In some embodiments, the display screen 1204 may be an LED or OLED screen. The computing device 1202 may be configured to have a camera 1208. Camera 1208 may receive optical data and report it to the computing device 1202, thereby providing facial recognition and security. In some embodiments, the computing device 1202 may be connected to a database 1210.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
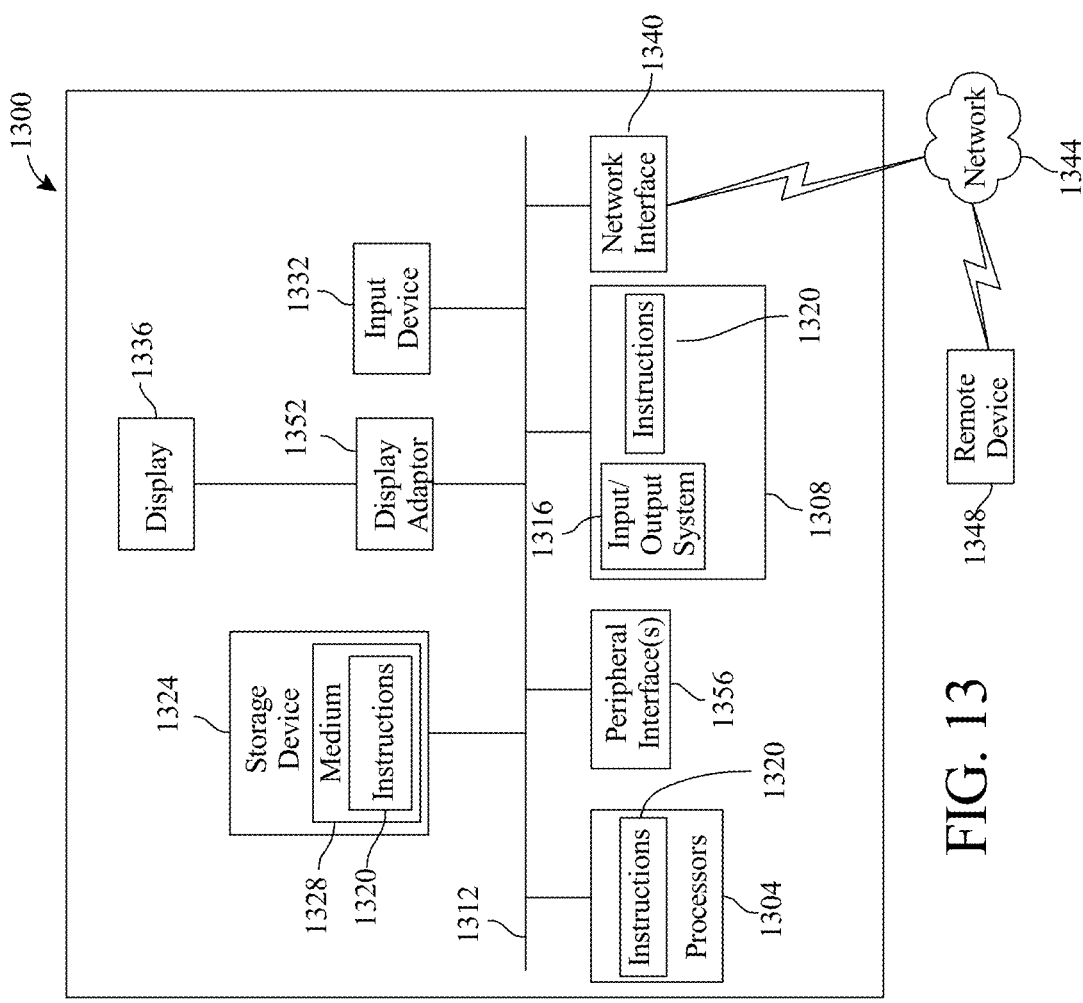
FIG. 13 is a flow diagram illustrating an exemplary embodiment of a computing system.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions may be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A recharging station for an electric aircraft, the system comprising:
   an elevated landing pad;
   a recharging component coupled to the elevated landing pad;
   a power delivery unit configured to deliver stored power from a power supply unit to the recharging component; and
   a support component coupled to the bottom of the elevated landing pad,
   wherein the support component includes a hydraulic lift system configured to move one or more persons and cargo to the elevated landing pad.

2. The system of claim 1, wherein the recharging component further comprises a trickle charger.

3. The system of claim 1, wherein the elevated landing pad further comprises an integrated lighting system.

4. The system of claim 3, wherein the integrated lighting system of the elevated landing pad further comprises LEDs with night vision goggle compatibility.

5. The system of claim 1, wherein the elevated landing pad further comprises a deicing system.

6. The system of claim 1, wherein the power supply unit includes a solar inverter for on-site power generation.

7. The system of claim 1, wherein the support component includes a plurality of housing units.

8. The system of claim 7, wherein one of the housing units of the plurality of housing units of the support component comprises freshwater storage.

9. The system of claim 8, wherein one of the housing units of the plurality of housing units of the support component comprises a kitchen.

10. The system of claim 1, further comprising a battery management system.

11. The system of claim 1, further comprising a thermal management system.

12. The system of claim 1, wherein the recharging station is configured to communicate data to and from an electric aircraft.

13. The system of claim 1, further comprising a battery health monitoring system.

14. The system of claim 1, wherein the electric aircraft is an eVTOL.

15. A method of charging an electric aircraft using an elevated landing pad, the method comprising:
providing an elevated landing pad coupled to a rechargeable component, the rechargeable component connected to a power delivery unit;
connecting an electric aircraft placed on the elevatable landing pad coupled to the rechargeable component;
charging the electric aircraft with power delivered by the rechargeable component; and
a support component coupled to the bottom of the elevated landing pad,
wherein the support component includes a hydraulic lift system configured to move one or more persons and cargo to the elevated landing pad.

16. The method of claim 15, wherein the power delivery unit is configured to deliver power stored from a power storage unit.

17. The method of claim 15, wherein the power storage unit has a storage capacity of at least 500 kwh.

18. The method of claim 15, wherein the power delivery unit is configured to connect to the power storage unit through a DC to DC converter.

19. The method of claim 15, wherein two or more electric aircrafts are charged through the rechargeable component.

* * * * *